Figure 1:
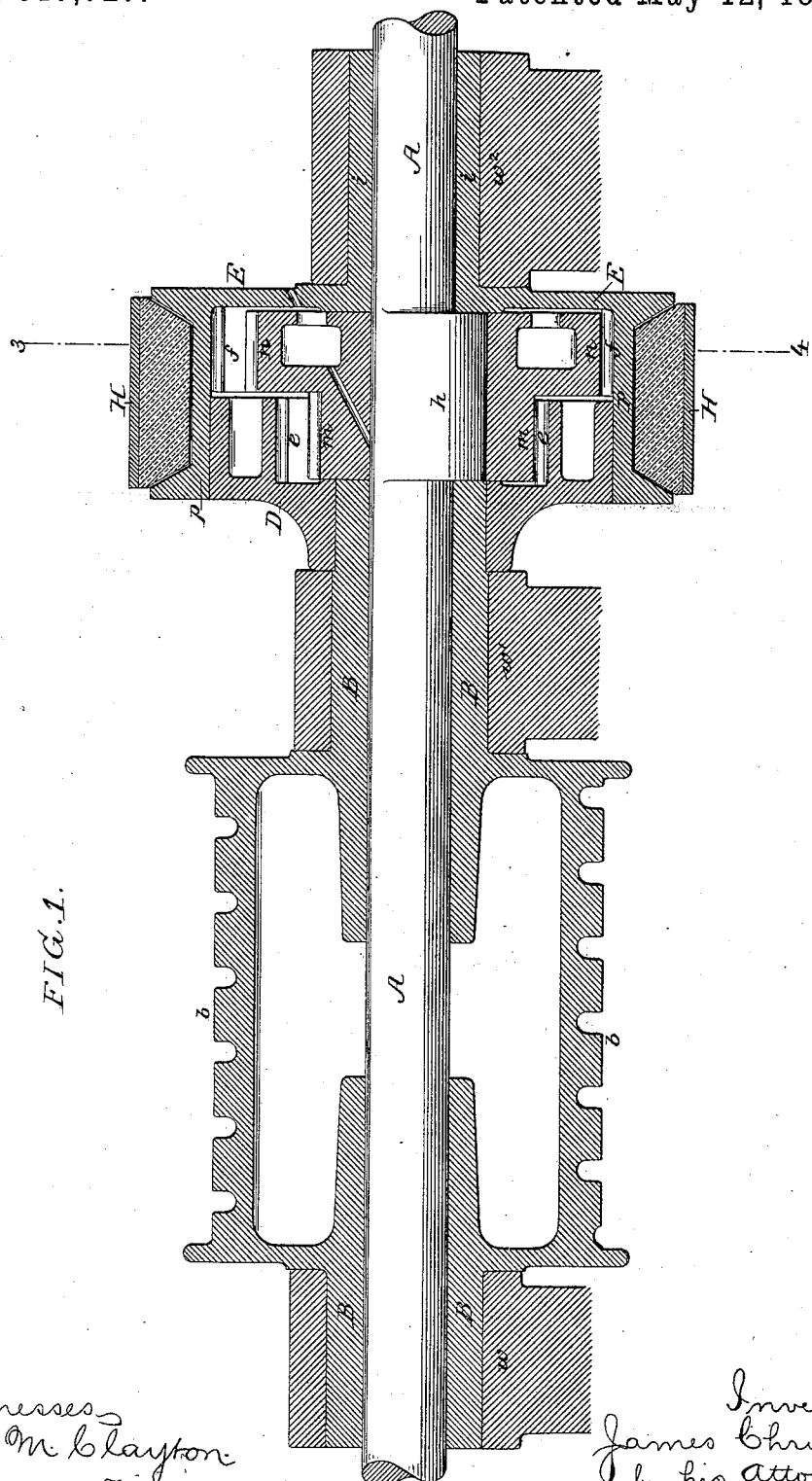

(No Model.)  2 Sheets—Sheet 1.

J. CHRISTIE.
HOISTING AND HAULING GEAR.

No. 317,727. Patented May 12, 1885.

Witnesses
John M. Clayton
James F. Tobin

Inventor
James Christie
by his Attorneys
Howson & Sons

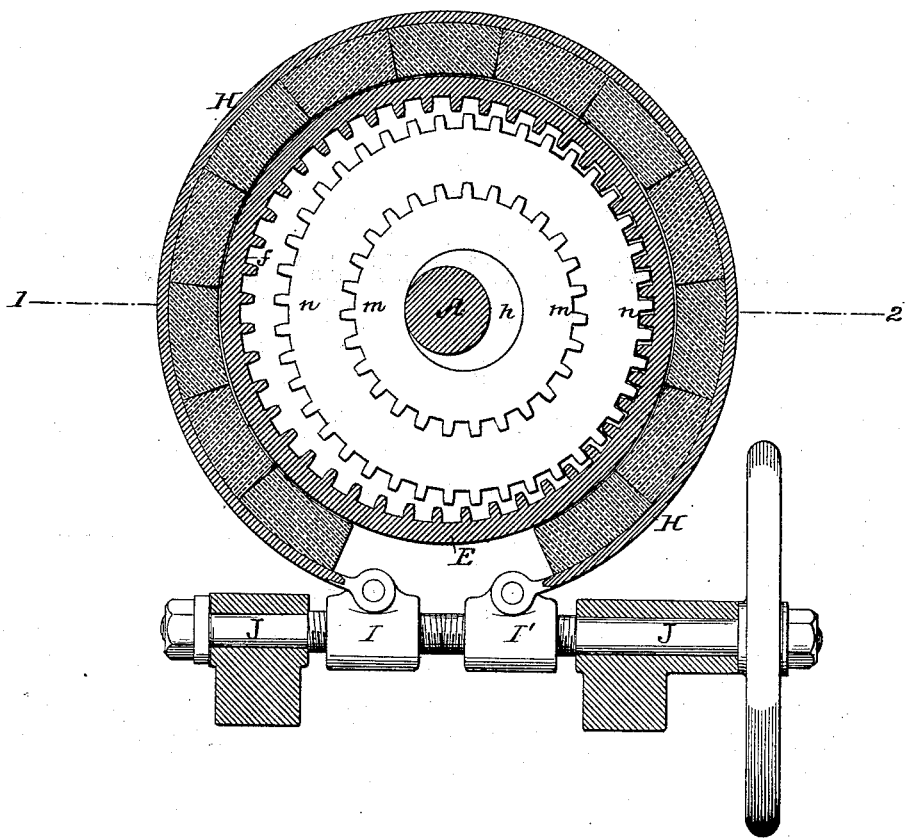

UNITED STATES PATENT OFFICE.

JAMES CHRISTIE, OF PHILADELPHIA, PENNSYLVANIA, ASSIGNOR OF ONE-HALF TO PERCIVAL ROBERTS, OF SAME PLACE.

HOISTING AND HAULING GEAR.

SPECIFICATION forming part of Letters Patent No. 317,727, dated May 12, 1885.

Application filed November 24, 1884. (No model.)

*To all whom it may concern:*

Be it known that I, JAMES CHRISTIE, a citizen of the United States, and a resident of Philadelphia, Pennsylvania, have invented certain Improvements in Hoisting and Hauling Gear, of which the following is a specification.

The main object of my invention is to so combine the well-known differential gearing with shafts and braking devices as to produce simple and effective hoisting or hauling mechanism, and this object I attain in the manner which I will now proceed to describe, reference being had to the accompanying drawings, in which—

Figure 1 (Sheet 1) is a longitudinal section on the line 1 2, Fig. 2, of my improved gearing for hoisting purposes, the main shaft in this view being in elevation; and Fig. 2, (Sheet 2,) a transverse section on the line 3 4, Fig. 1, showing the wheels in elevation.

A tubular shaft, B, of which a spirally-grooved barrel, $b$, in the present instance forms a part, is loose on and concentric with the drum-shaft A, and a wheel, D, having internal teeth $e$, is secured to the tubular shaft, another wheel, E, having internal teeth $f$ being loose on the said shaft A.

Between the two wheels D and E, and on an eccentric portion of the shaft, is a duplex cog-wheel—that is, two wheels, $m$ and $n$, turning together, and preferably made in one casting, the teeth of the wheel $m$ gearing into the internal teeth $e$ of the wheel D, and the teeth of the wheel $n$ gearing into the internal teeth $f$ of the wheel E. The wheel E is in the present instance furnished with a flange, $p$, which overlaps wholly or in part the periphery of the wheel D, the latter fitting snugly, but so as to turn freely and without undue friction in the said flange, in order that the latter may contribute to the steadiness of the wheel E on the shaft A. Braking mechanism, which may be of different styles without departing from my invention, is combined with the wheel E, the braking devices described hereinafter being preferred.

It has not been deemed necessary to show in connection with the above-described gearing any frame-work, as the latter must necessarily be varied in accordance with the application of my invention to different kinds of hoisting or hauling mechanism. The gearing may be adopted, for instance, in the construction of a crab, a traveling crane, or a gib-crane, or in any of the different kinds of raising or lowering apparatus, as well as in hauling mechanism—a capstan, for instance—and these applications will necessarily demand different kinds of frames; hence it will suffice to remark here that the gearing shown in the drawings, which is intended for a crab, has bearings $w\ w'$ for the tubular shaft B, and a bearing, $w^2$, for the elongated tube $i$ of the wheel E. The wheels $m$ and $n$, controlled by the eccentric portion of the shaft A, and the internally-toothed wheels D E form the well-known differential gearing, which, of course, I do not claim *per se*. As long as the wheel E is not under outside influences, the tubular shaft B and wheels D and E will be free from the control of the shaft A and at liberty to revolve independently of the same; but if the wheel E should be arrested the motion will be transferred from the shaft A through the medium of the differential gearing to the wheel D and the tubular shaft B with an increase of power determined by the relative character of the cog-wheels and racks constituting the said differential gearing. When an object which has been raised has to be rapidly lowered by its own weight, all that is necessary is to free the wheel E from the control of outside influences.

For retaining the wheel E, I prefer the braking mechanism shown in Fig. 2. This consists of a flexible band, H, lined with blocks of wood, or it may be lined with other material for imparting friction to the periphery of the wheel E. One end of the band is connected to a block, I, and the other end to a similar block, I', these blocks being internally threaded, one to accord with a right-hand thread cut on the screw-shaft J and the other with a left-hand thread on the said shaft, the latter being adapted to fixed bearings on the frame-work of the crab, crane, or other hoisting device to which the invention may be applied.

It should be understood that, while I prefer this braking mechanism, I do not restrict myself thereto, as other available retaining or stopping mechanisms for controlling the wheel E will readily suggest themselves to mechanics expert in machinery of this class.

As before remarked, a grooved barrel, b, forms part of the tubular shaft; but any other kind of barrel may be either secured to or form a part of the said shaft, or the latter may be geared to hoisting mechanism.

It will be seen that the mechanism is of very simple construction and composed of but few parts, easily put together, the duplex cog-wheel m n being retained in its place on the eccentric portion of the shaft A by and between the end of the tubular shaft B and the wheel E.

I claim as my invention—

1. The combination of the driving-shaft A and its eccentric h, the tubular shaft B and wheel D thereon, the wheel E, loose on the shaft A, the wheels m and n, adapted to the eccentric portion of the shaft, and a device for arresting the wheel E, all substantially as set forth.

2. The combination of the shaft A and tubular shaft B, and the wheels D and E, forming part of the differential gearing, the said wheel E having a flange overlapping the wheel D, substantially as specified.

3. The combination of the shafts A and B, the wheels D and E, forming part of the differential gear, and braking mechanism applied to the flange p of the said wheel E, substantially as specified.

In testimony whereof I have signed my name to this specification in the presence of two subscribing witnesses.

JAMES CHRISTIE.

Witnesses:
JOHN M. CLAYTON,
HARRY SMITH.